United States Patent [19]
Mathew

[11] 4,395,633
[45] Jul. 26, 1983

[54] LEVEL GAUGE USING NEUTRON IRRADIATION

[75] Inventor: Plackottu J. Mathew, Parkville, Australia

[73] Assignee: Commonwealth Scientific and Industrial Research Organization, Campbell, Australia

[21] Appl. No.: 182,183

[22] Filed: Aug. 28, 1980

[30] Foreign Application Priority Data

Sep. 11, 1979 [AU] Australia ............................. PE0418

[51] Int. Cl.³ ............................................. G01F 23/00
[52] U.S. Cl. .................................. 250/357.1; 250/392
[58] Field of Search ............................... 250/357, 392

[56] References Cited

U.S. PATENT DOCUMENTS

| | | | |
|---|---|---|---|
| 2,378,219 | 6/1945 | Hare | 250/357 |
| 3,716,711 | 2/1973 | Olesen | 250/357 X |
| 4,038,548 | 7/1977 | Charlton | 250/357 |
| 4,216,376 | 8/1980 | Griffin et al. | 250/357 |
| 4,297,575 | 10/1981 | Smith, Jr. et al. | 250/269 X |

Primary Examiner—Davis L. Willis
Attorney, Agent, or Firm—Sughrue, Mion, Zinn, Macpeak & Seas

[57] ABSTRACT

Measurement of the level of materials in bins, hoppers, and the like is effected by a neutron monitoring technique. A sensor is located to move substantially vertically in a guide located in or near the bin or hopper. The sensor contains a fast neutron source, a detector of thermal neutrons, and a moderator-containing material in the vicinity of the detector. In a preferred form of the sensor, the neutron source and thermal neutron detector are separated by lead and cadmium screening, and the moderator-containing material is a sheath of polyethylene around the detector. With sensors of this type, material levels may be sensed whether the material contains a neutron moderator or not.

8 Claims, 4 Drawing Figures

LEVEL GAUGE USING NEUTRON IRRADIATION

FIELD OF THE INVENTION

This invention concerns the determination of the level of a solid or liquid material in a container, and in particular relates to a level gauge for containers such as industrial bins.

BACKGROUND OF THE INVENTION

Accurate, continuous measurement of the level of contained materials is important to the efficiency and economy of many operations in the mining and manufacturing industries. Bins, silos, and hoppers (both surface and underground types in different shapes and sizes) hold or convey large quantities of materials, with occasionally up to several thousand tonnes capacity. The diameters of such bins may exceed 20 m and bin heights of up to 50 m are common. The measurement of the level of the material in such bins is one of the problems associated with their use.

A variety of commercial level gauges are available at present. These include gauges which use mechanical, electro-mechanical, 1sonar, microwave and optical techniques, pressure switch type gauges, and gauges which use gamma ray transmission or backscatter.

The available gauges are, however, subject to several disadvantages. The contact type devices are subject to mechanical damage, and some devices cannot stand the extreme environment inside industrial bins (dust, noise, mechanical vibration, and the like). Exposed moving parts tend to get clogged up with dust. Sonar level gauges fail to indicate true level due to reflections from thick clouds of dust common in industrial bins, and the build up of dust in the sound generator receiver system is another problem. The optical level gauges also fail due to the dust problem. Because of the large dimensions of bins, the gamma ray transmission type level gauges require strong radiation sources which are a potential health hazard. Moreover, the use of such sources restricts access by maintenance workers to the inside of the bins.

The use of neutron irradiation has been established as a promising technique for level gauging of liquids containing hydrogen by several workers in this field. For example, U.S. Pat. No. 2,378,219 discloses a neutron level gauge for determining the level of a liquid in a vessel. The apparatus disclosed in that specification consists of a fast neutron source and a thermal neutron detector. The device is placed on the outside wall of the vessel and the fast neutrons thermalized by the liquid reach the detector. The level of liquid is determined by moving the source-detector assembly vertically along the wall and noting the point at which a sudden change in the thermal neutron intensity is indicated by the detector.

From the work of S. Barnartt and K. H. Sun (see their paper in "Nucleonics", Vol. 13, May 1955), it was shown that a neutrol level gauge employing a fast neutron source and a thermal neutron detector could be used for the determination of levels of hydrogenous and other light liquids to an accuracy of ±2 mm. Barnartt and Sun also suggested that their gauge could be placed either outside the vessel on the wall or inside the liquid.

The specification of British Pat. No. 938,233 describes a method and apparatus for determining the quantity of liquid in a container employing an assembly of fast neutron sources and a thermal neutron detector. In this case, the parameter measured is the quantity of the liquid in the container and not the level. U.S. Pat. No. 3,716,711 describes an apparatus consisting of a fast neutron source and a thermal neutron detector with suitable shielding intended for measuring the water level in the compartment of sunken vessels. Another application of the neutron thermalising properties of hydrogenous liquids is disclosed in the specification of British Pat. No. 1,288,263. In that apparatus, a lengthy thermal neutron counter and a large number of neutron sources are employed. The detector-neutron source assembly is placed directly inside the liquid in a vessel or inside a stand-pipe placed in the liquid. It should be pointed out that such a device is economically impractical for use in large vessels because of the prohibitive length of the neutron detector and the high cost of a large number of neutron sources.

All the above neutron level gauges have severe disadvantages in meeting the needs of modern industry. Firstly, considerable modification of the instrumentation is needed for the devices to function as continuous level gauges in large bins. Secondly, they can only be used for level gauging of liquids or solids containing hydrogen or other neutron moderating elements, and this precludes the use of these level gauges in bins which handle, for example, dry materials devoid of hydrogen, beryllium, carbon and the like. Consequently, there is a need for a continuous level gauge for solids and liquids which may not contain hydrogen.

It is an object of the present invention to provide a continuous level gauge which is applicable to both solids and liquids, whether or not they contain a neutron moderating element. Another object of the invention is to provide a level gauge which is simple, reliable, easy to operate and repair, and free of hazards applicable to bins of surface and of underground type, irrespective of their sizes and wall thickness. A further object is to provide a level gauge which can produce control signals to other devices, and therefore be of great help in automating various handling operations, thus improving the efficiency and lowering the operating cost of the facility with which they are used.

SUMMARY OF THE INVENTION

According to the present invention there is provided apparatus for determining the level of a solid or liquid material in a container comprising:
  (a) generally vertical guide means disposed within or alongside the container;
  (b) a sensor positioned within said guide means;
  (c) means for moving said sensor along said guide means; and
  (d) means for monitoring the position of the sensor within the guide means;
said sensor comprising a source of fast neutrons, a detector for thermal neutrons, and a body of a moderator-containing material located in the vicinity of said detector, whereby thermal neutrons produced by irradiation of the solid or liquid material by said fast neutrons or by irradiation of said moderator-containing material by fast or epithermal neutrons reflected by the said solid or liquid material are detected by said detector when said sensor is positioned within said guide means at or below the level of the solid or liquid material in the container.

In another aspect, the present invention provides a method of determining the level of a solid or liquid material within a container, which method comprises (a) moving a sensor generally vertically within or alongside the container, said sensor comprising a source of fast neutrons, a detector for thermal neutrons, and a body of a moderator-containing material located in the vicinity of said detector;

(b) monitoring the position of the sensor within the container; and (c) correlating the position of the sensor with an output signal from the sensor, said output signal being produced by said detector on detection of thermal neutrons produced when the solid or liquid material is irradiated by said fast neutrons, or produced by irradiation of said moderator-containing material by fast or epithermal neutrons reflected by the said solid or liquid material, when said sensor is positioned at or below the level of the solid or liquid in the container.

The present invention provides apparatus and a method for determining the level of a solid or liquid material in a container making use of neutron radiation, and specifically a weak neutron source, which is found to be free of several of the disadvantages inherent in commercially available level gauges. In particular, whereas presently available commercial nuclear radiation level gauges require extremely strong radiation sources which can be a potential health hazard, the present system may use only a small neutron radiation source which presents little or no radiation hazard. In addition, the incorporation of the body of moderator-containing material into the sensor of the present invention provides a system which may be used in the determination of the level of materials which do not contain a neutron moderator as well as of materials which do contain a moderating element.

The body of moderator-containing material in the sensor of this invention is conveniently, and preferably, provided in the form of a sheath of hydrogen-containing material surrounding the thermal neutron detector. The hydrogen-containing material may be any suitable material, for example, polyethylene (polythene). When the apparatus of the present invention is used in the determination of the level of materials which do not themselves contain hydrogen (the most commonly-found neutron moderator), fast neutrons from the neutron source are scattered by the material when the sensor is below the level of the material, and neutrons still carrying energy above the thermal level are thus reflected into the hydrogen-containing material where they are thermalised before entering the detector to indicate the presence of scattering material.

DESCRIPTION OF THE DRAWINGS

Embodiments of the apparatus of the present invention will now be described with reference to the accompanying drawings, in which.

DETAILED DESCRIPTION OF EMBODIMENTS OF INVENTION

Figure 1:
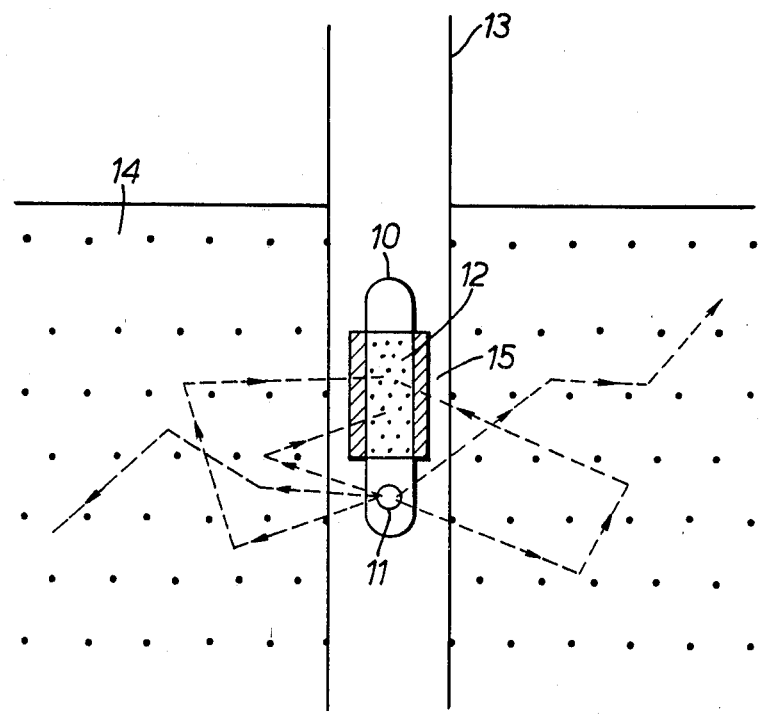
FIG. 1 is a schematic representation of a sensor located within a pipe in a storage bin.

The basic principles of the present invention are illustrated diagrammatically in FIG. 1. The level sensor 10, consisting of a fast neutron source 11 and a thermal neutron detector 12, is placed inside a protective pipe 13 (for example, a steel pipe) which forms the guide means of the apparatus and which in turn is located within the material 14 of which the level is to be measured. The fast neutrons from the source enter the material 14 and undergo scattering. If the material contains hydrogen or another neutron moderator, the fast neutrons are readily thermalised and some of the thermal neutrons enter the thermal neutron detector 12, producing signals indicating the presence of thermalising materials around the protective pipe (and guide means) 13. When the fast neutron source and thermal neutron detector assembly is above the level of material, in the absence of materials to scatter and thermalise fast neutrons, no signals are produced in the detectr. This also occurs with the neutron level gauging methods for hydrogenous materials embodied in the prior art described above. If the hydrogenous material is replaced by materials devoid of neutron moderator, however, the fast neutrons still undergo scattering but they are not readily thermalised. Some of these scattered neutrons with energies above the thermal level do in fact enter the detector but they do not produce signals. Thus previous techniques utilising neutron irradiation could not be used for level gauging materials free of a neutron moderator.

In the embodiment of this invention as illustrated, by way of example, in FIG. 1, a sheath 15 of a hydrogen-containing material (for example, polythene) is placed around the detector. In this configuration the scattered neutrons from the dry material, still carrying energy above the thermal level, are thermalised by the hydrogen in the material of the sheath before entering the detector. These thermal neutrons produce signals in the detector thereby indicating the presence of scattering materials around the detector. When the sensor 10 is above the level of the material being monitored, no neutron signals are recorded by the detector due to the absence of scattering material around the device. When the sensor enters the material from above, a sudden increase in neutron signals in the detector takes place. Similarly, when the sensor leaves the material from below, a sudden decrease in neutron signals takes place. Thus, this change in response of the sensor can be utilised for determining the level of materials devoid of hydrogen in a container and, as the polythene sheath does not prevent the passage of thermal neutrons, the same sensor can be used for materials which do contain a neutron moderator.

The feasibility of the method of this invention has been studied in the laboratory using a weak (10 mCi) Am/Be fast neutron source and a $^3$He thermal neutron detector. This neutron source produced about $2.5 \times 10^4$ neutrons/sec.

Figure 2:
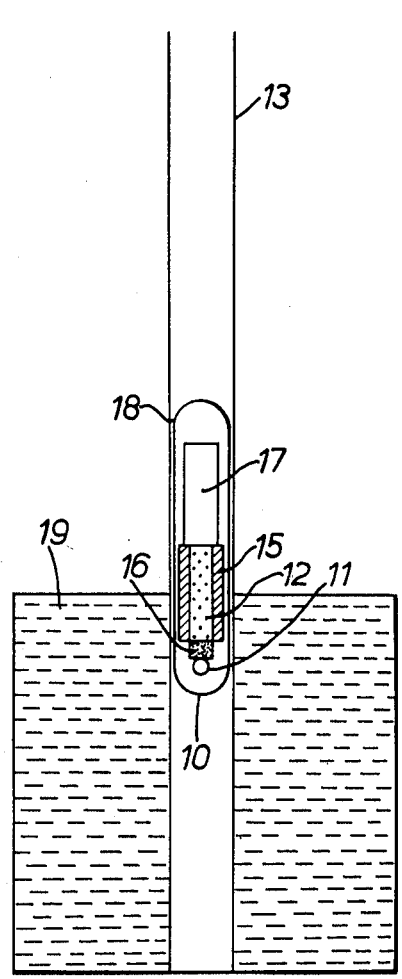
FIG. 2 is a similar drawing to FIG. 1 in which the sensor is shown in more detail.

The configuration of the level sensor 10 used is shown in FIG. 2. The neutron source 11 and the detector 12 were separated by a shielding 16 consisting of a 2 cm thick lead disc and a 1 mm thick disc of cadmium. This shielding prevented slow neutrons and gamma rays directly entering the detector from the source.

The thermal neutron detector 12 was surrounded by a removable polythene sheath 15. The neutron source, the detector and associated electronics 17 (preamplifier, amplifier, power supply, etc.) were enclosed in an aluminium tube 18 of 4 cm diameter, and the neutron signals from the detector were monitored with a scaler controlled by a timer (not shown).

A 44 gallon drum of dry sand 19 with a 7.5 cm (I.D.) steel pipe 13 placed in the centre was used to simulate a bin filled with a material free of hydrogen. The experimental procedure consisted of monitoring the neutron count rate when the level sensor 10, with and without the polythene sheath 15, was at various distances above and below the level of sand in the drum.

Figure 3:
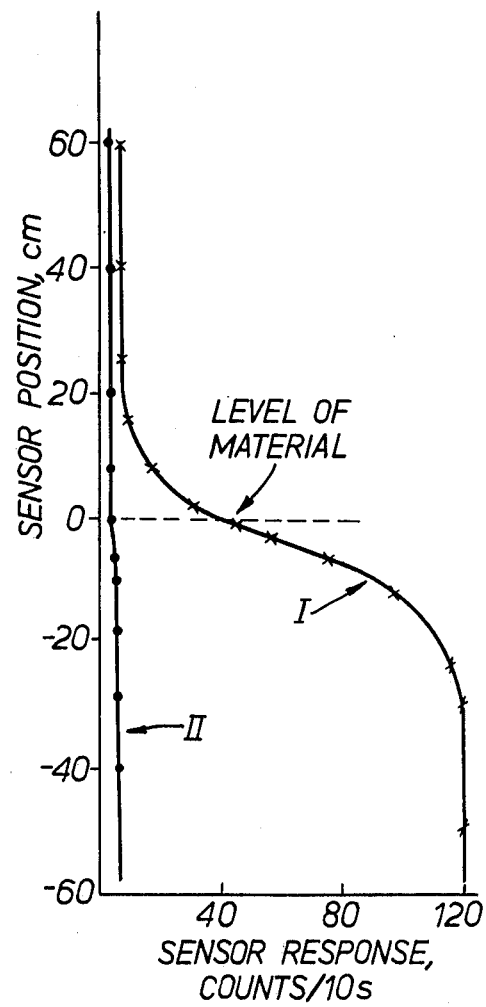
FIG. 3 illustrates a typical sensor response.

FIG. 3 is a plot of the position of the sensor 10, as measured from the middle-point of the detector to the dry sand level, against the count rate recorded by the detector. Curve I in FIG. 3 represents the sensor response characteristics when the detector is surrounded by a polythene sheath, whereas Curve II represents the sensor response characteristics without the polythene sheath. An examination of Curve II in FIG. 3 [i.e. level sensor response characteristics without the polythene sheath] shows that the change in the sensor response is very small at the interface. This experimental result confirms that statement made earlier that a conventional level sensor consisting of a fast neutron source and thermal neutron detector cannot be used as a means of level gauging materials devoid of a moderator. An examination of Curve I in FIG. 3 [i.e. the level sensor response characteristics with the polythene sheath] shows an enormous change in sensor response at the interface. When the sensor is well above the level of material, the detector count rate is small. This small count is mainly due to 'leaking' of thermal neutrons through the shield or scattered from surrounding materials, such as the probe housing and the polythene sheath. As the sensor approaches the level of the material the count rate remains low until about 10 cm before the interface formed by the dry sand level and then rapidly rises to an intermediate range when it is at the level, and reaches a high level when the sensor is well inside the material. Thus the sensor has three distinct levels of response depending upon its position with respect to the material as follows:

(a) 'Low' when the sensor is well away from the material.
(b) 'Intermediate' when the sensor is at the level of the material.
(c) 'High' when the sensor is well inside the material.

By making use of these three distinct levels of sensor response in conjunction with suitable electronic logic circuitry and accessories, a continuous level gauge can be readily constructed.

Figure 4:
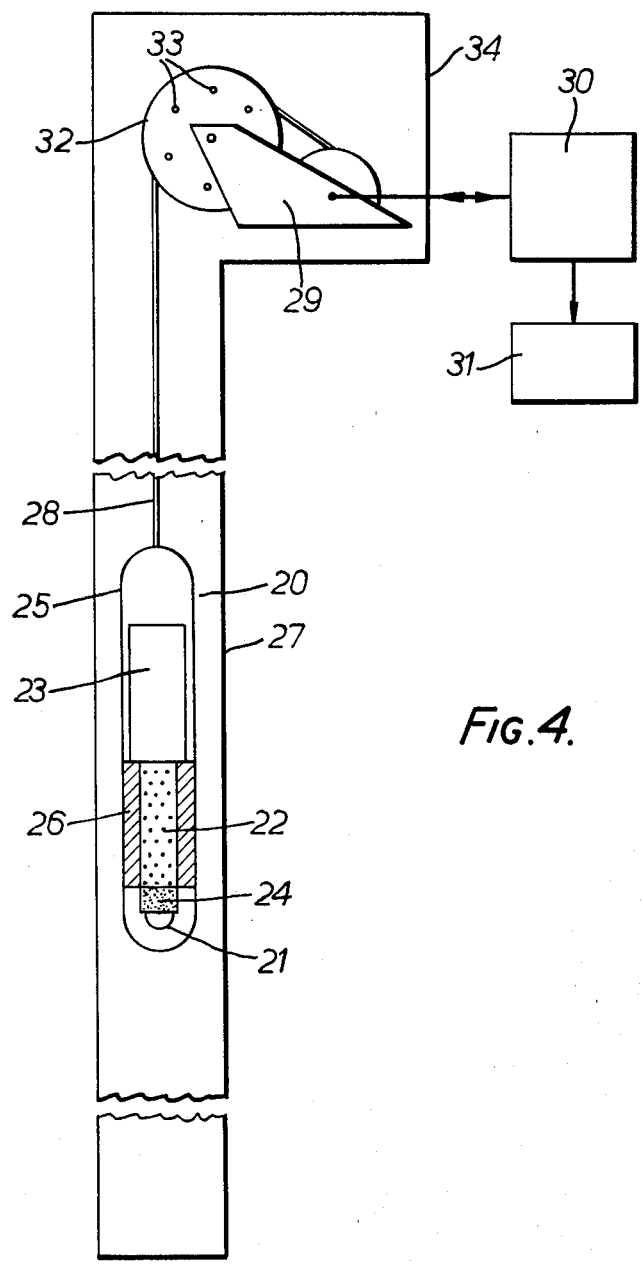
FIG. 4 shows the construction of an alternative form of level gauge.

A schematic diagram of another embodiment of the apparatus of this invention is shown in FIG. 4. The level gauge of this embodiment consists of sensor 20 and protective pipe (and guide means) 27, electric mini-winch system 29 and guide wheel 32, and electronic logic circuit 30 and display unit 31.

The sensor 20 consists of a small fast neutron source 21 (e.g. a 10 mCi Am-Be neutron source) plus a thermal neutron detector 22 (e.g. a $^3$He neutron detector) and associated electronics system 23. The neutron source 21 and the detector 22 are separated by a shield 24 made up of a 2 cm thick lead piece and a cadmium disc of 1 mm in thickness. The neutron source 21, detector 22 and the associated electronics system 23 are encased in an aluminium (or some other suitable material) barrel 25. The electronics system 23 consists of a preamplifier-amplifier-discriminator chain and a high tension power supply unit. The neutron detector 22 is surrounded by a polythene sheath 26. The protective pipe 27 may be of any suitable size, length and material (in most cases mild steel will be adequate), but strong enough to be anchored vertically in the bin at a suitable location in the material of which the level is to be measured.

The sensor 20, suspended by a cable 28 from the mini-winch 29 through the guide wheel 32 moves within the protective pipe which is anchored in the bin. The cable carries power to the sensor 20 and also takes the thermal neutron signals from the sensor to the electronic logic circuit 30.

The mini-winch system 29 consists of an electric motor and a cable drum. The mini-winch system is controlled by the electronic logic circuit system 30 through relays. The electronic logic circuit system can, by activating the relays, raise, lower or hold the sensor in any position within the protective pipe.

In operation, the sensor 20 encounters a "high" neutron count when it is within the material, a "low" neutron count when remote from it, and an "intermediate" count when at the level of the material. The electronic logic circuit 30 can discriminate between these three count rates, and will command the mini-winch system to raise the sensor when the count rate is "high", to lower the sensor when the count rate is "low", or to hold the sensor when the count rate is "intermediate". Consequently, the sensor always follows the level of material, and a position reading will appear on the display unit 31. The level indication of the sensor is derived, for example, from the number of rotations of the guide wheel 32, over which the cable passes, with the help of magnets 33 attached to the guide wheel and a Hall effect switch (not shown) coupled to an up/down counter. The display unit 31 gives the level of material in the container.

The electronic logic circuit system 30, apart from controlling the mini-winch and display units, can also supply control signals for other operations, such as process control in industrial operations.

As shown in FIG. 4, the mini-winch system 29 is enclosed in a metal box 34 to exclude dust and moisture. In addition to dry materials, the level gauge of this invention can also be used for level gauging materials which contain hydrogen, whether they be solids or liquids. It is a completely sealed system and can therefore be used in hostile environments with mechanical vibration, noise, dust, etc. For corrosive materials, the protective pipe can be of inert material. This gauge can be used for both surface and underground bins, irrespective of their size and wall thickness. In addition, the present gauge gives level information in the form of electric signals which can be used for controlling other operations in the industry.

While the present invention has been described and illustrated herein with reference to one embodiment thereof, it will be clear to those skilled in the art that many variations and modifications may be made to this embodiment without departing from the spirit and scope of the invention as broadly described herein. In particular, the guide means, which has been shown in the exemplary embodiments as a protective pipe located within the material in a container, may be a conduit formed in the walls of the container, or may be a suitable guide means located external to, but closely adjacent to, the container. In addition, the guide means may be inclined relative to the vertical (which situation is encompassed by the term "generally vertical" used earlier in this specification), provided that the detector assembly can move freely within the guiding structure, under the influence of the means used to move the detector assembly (which means includes compressed air).

I claim:

1. Apparatus for determining the level of a material in a container, said apparatus comprising:
   (a) generally vertical guide means extending between the base and the top of the container;
   (b) a sensor positioned within said guide means;
   (c) means for moving said sensor along said guide means; and
   (d) means for monitoring the position of the sensor within the guide means; said sensor comprising
      (i) a source of fast neutrons;
      (ii) a detector for thermal neutrons, and
      (iii) a sheath of a moderator-containing material surrounding said detector; whereby thermal neutrons produced by irradiation of the material by said fast neutrons and thermal neutrons produced by irradiation of said moderator-containing material by neutrons reflected by the said material are detected by said detector when said sensor is positioned within said guide means at a level which is not substantially higher than the level of the material in the container.

2. Apparatus as defined in claim 1, wherein said sheath is removably located around the detector.

3. Apparatus as defined in claim 2, in which said moderator-containing material is polythene.

4. Apparatus as defined in claim 3, including screening of lead and cadmium between said neutron source and said thermal neutron detector.

5. Apparatus as defined in claim 4, in which said guide means is a conduit located within the container, a cable suspending said sensor within said conduit, a cable winch is provided for lowering and raising said sensor within said conduit, and means are provided for monitoring the movement of said cable.

6. Apparatus as defined in claim 1, claim 2 or claim 5, in which said guide means is located within said container.

7. Apparatus as defined in claim 1, claim 2 or claim 5, in which said guide means is located outside, but alongside, said container.

8. A method for determining the location of the top surface of a material stored in a container, said material neither comprising nor containing a neutron moderating element, said method comprising the steps of
   (a) irradiating said material with fast neutrons;
   (b) monitoring the thermal neutrons generated in a neutron-moderating medium by the action of fast neutrons scattered by said material, said neutron-moderating medium being located in the vicinity of said material; and
   (c) moving said neutron-moderating medium substantially vertically within the levels of the top and bottom of said container and noting the level at which there is a discontinuity in the production of said thermal neutrons.

* * * * *